Patented June 12, 1923.

1,458,543

UNITED STATES PATENT OFFICE.

FRITZ POLLAK, OF VIENNA, AUSTRIA.

CONDENSATION PRODUCT AND METHOD OF MAKING SAME.

No Drawing.    Application filed January 10, 1922.   Serial No. 528,339.

*To all whom it may concern:*

Be it known that I, FRITZ POLLAK, a citizen of the Czechoslovakian Republic, and residing at Vienna, in the county of Vienna and State of Austria, have invented certain new and useful Improvements in Condensation Products and Methods of Making Same (for which application for patent in Austria has been filed on November 3, 1920), and of which the following is a specification.

The present invention relates to the manufacture of condensation products from a urea on the one hand and formaldehyde on the other hand which, as contradistinguished from other reaction products of this kind are found to be useful in many arts.

The reaction between urea (carbamide) and formaldehyde leads (according to the conditions selected) to very different results. Thus Goldschmidt (Berliner Berichte, vol. 29, page 2438) has found that when a solution of urea in hydrochloric acid is caused to act on formaldehyde in excess in the cold, a product is obtained which is insoluble in most solvents. In the German Patent No. 97164 he states that by the action of urea on formaldehyde in the proportion by weight of 1 to 5 (1 molecule of urea to 4 molecules of formaldehyde) in alkaline solution and in the cold dimethylol of urea

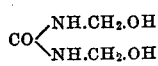

is obtained. This is denied by Einhorn and Hamburger (Berliner Berichte, vol. 41, page 24) who obtain dimethylol of urea from 1 molecule of urea and 2 molecules of formaldehyde in the presence of a little hydroxide of barium at 25 to 30° centigrade. In a similar manner monomethylol of urea is obtained by the action of urea in excess and in the presence of a very small quantity of hydroxide of barium on formaldehyde when cooling with ice. At last it has been proposed (in the United States Patent No. 1,355,834) to carry out the reaction in the absence of condensing agents and while heating, for obtaining condensation products which are believed to be different from dimethylol of urea.

Now I have found that by means of this reaction condensation products fit for use in industry can only be obtained, if just in presence of basic condensation agents the reaction of formaldehyde on carbamide or thiocarbamide or their derivatives is brought about by heating and if the heating is continued up to the formation of easily gelatinizing products, which in the further course of the heating are hardening to form a glasslike mass. During this reaction most likely dimethylolcarbamide is formed as an intermediate product. In any case, if the process is started with dimethylocarbamide instead of the mixture of formaldehyde and of urea, exactly the same intermediate and final products can be obtained. Urea itself may be used as a condensing agent, this compound too being a weak base, although this is not a particularly advantageous mode of carrying into practice the present process. But it has been found that ammonia is a very suitable condensing agent in connection with this reaction and ammonia may be added beforehand in the form of hexamethylentetramin which is formed in any case from ammonia and formaldehyde. Pyridine for instance is also a suitable condensing agent in certain cases. Whatever base may be used as a condensing agent, it undoubtedly results in a considerable acceleration of the reaction.

The final product obtainable by the present process of the reaction between urea and formaldehyde is limpid transparent uncoloured mass insoluble in acids and alkalies which is particularly distinguished by its indifference to acids even to nitric acid. This mass is entirely different from those heretofore obtained by its other properties also, inasmuch as it does not soften on being heated and is notably harder and stronger.

Its specific gravity is 1.3 and it is carbonized only at temperatures above 300° centigrade, its hardness is approximately that of the entirely hardened condensation products of phenols and formaldehyde, its fracture is conchoidal and it may be very easily sawed, turned, bored, filed and polished and it has a high lustre.

The initial products of the chemical condensation are uncoloured transparent limpid liquids readily soluble in water. By heating these initial products for a short time they are at first converted into another condensation product which is intermediate in character between the initial and the final products above described and which is hereinafter referred to as the intermediate condensation product. These latter are soluble in commercial formaldehyde but insoluble in water and may be precipitated from their solutions in formaldehyde in a gelatinous form by means of water. They swell with water, do not fuse together when heated, but after removal of the water contained in the same they fairly closely resemble soft rubber. For convenience I will hereinafter refer to both the initial and intermediate condensation products as "partial reaction products" in contradistinction to the insoluble and infusible mass which constitutes the final condensation product.

For carrying out the reaction in the heat heretofore formaldehyde had been used in large excess. It has now been found that it is advantageous to avoid as far as possible the presence of free formaldehyde on converting the initial condensation products into the intermediate and final ones. Preferably the use of any excess of formaldehyde is avoided beforehand, that is to say, in making the soluble initial condensation product, or at any rate a smaller excess of formaldehyde is made use of than corresponds to 3 molecules of formaldehyde to 1 molecule of urea, whereas heretofore much larger quantities of formaldehyde had been caused to enter into the reaction. Basic condensing agents have, however, preferably to be made use of in any case, whether formaldehyde is used in a proportion not exceeding 3 molecules of the same to 1 molecule of urea, or whether a large excess of formaldehyde is used as heretofore; in this case any excess of formaldehyde has to be removed as far as possible before the initial condensation products are further treated.

The following are examples of carrying into practice my improved process:

*Example 1.*

162 parts by weight of commercial formaldehyde containing 40% by volume of pure formaldehyde are mixed with 5 parts by weight of 20% ammonia, to the mixture of formaldehyde and hexamethylentetramin thus formed 60 parts by weight of urea in a solid state are added. The urea is dissolved under considerable spontaneous cooling. When the urea is completely dissolved the solution is heated in a boiler with a reflux condenser which brings about an exothermic reaction. Boiling is maintained only until the mass does not become turbid on cooling. Then the product of reaction is brought into a vacuum apparatus and distilled in the waterbath until the residue has a syrupy consistency. Then the mass is filled into moulds and is heated to a temperature of 70 to 75° centigrade until it has converted into a hard fully transparent body of the properties above described. By dyeing and (or) making the mass turbid in any suitable way, imitations of amber, ivory, jet, corals, tortoiseshell, horn, mother of pearl and so on may be obtained therefrom.

*Example 2.*

If in the example 1 for the quantity of ammonia used as a condensing agent an equivalent of pyridine is used substances are obtained which are closely similar to those obtained in the example 1 except that the masses are not quite limpid; this process is therefore particularly suitable for preparing either of the partial reaction products, that is to say, the initial condensation product or the intermediate condensation product, which are intended to be converted into the insoluble final products only after incorporation into the same of some filling material.

*Example 3.*

To 141.7 parts by weight of commercial formaldehyde containing 40% by volume of pure aldehyde are added 6 parts by weight of hexamethylentetramin and to this 60 parts by weight of solid carbamide are added. The solution considerably cools in forming. When the urea is completely dissolved, the solution is heated in a boiler with a reflux condenser to the boiling point and is further treated as described in example 1.

As above mentioned the hardening of the initial reaction products may also take place in the presence of filling substances of any kind; for instance the product may be mixed with loose pulverulent or fibrous and cellular materials such as wood-pulp, asbestos fibres, chalk, plaster of Paris, carborundum, sand or the like, then brought into moulds and hardened either simultaneously or subsequently. Or, porous substances such as wood, pasteboard or asbestos fabric may be impregnated with the initial reaction products or a solution of the same and then hardened, or the solution may be used for impregnating steam packings, piston rings or the like and may then be converted by the heat of the steam into the insoluble and hard form. These solutions may also be applied to an endless band of paper fabric or the like whereupon the solvent is permitted to evaporate and the band is wound on a heated drum in such a manner that the successive layers are cemented to each other and the mass is hardened whereby homogenous round bodies are obtained. Or, the intermediate condensation product—either alone or mixed with substances soluble or insoluble in the same—may be applied to any suitable backing and then hardened. The intermediate condensation product which is insoluble in water, may be kneaded and compressed and thus is a suitable material for being mixed with pulverulent or fibrous filling materials and moulded in the heat whereupon by continued application of heat and pressure or heat alone it may be converted into the hard insoluble state.

Instead of urea, thiourea or substitution products of urea or of thiourea may be used, all of which I wish to be included along with urea in the designation a urea used in the following claims. The formaldehyde may be used either in the commercial aqueous solution or in the gaseous state or in the form of a solution of anhydrous formaldehyde or in the form of the polymers.

I claim:

1. The process herein described for manufacturing condensation products which consists in reacting on a urea with formaldehyde in presence of a base, the formaldehyde being present in a smaller proportion than would correspond to 3 molecules of formaldehyde to 1 molecule of the urea, and heating the mixture until there is effected the formation of an easily gelatinizing liquid initial condensation product capable of transformation into a hard insoluble final product.

2. The process for manufacturing condensation products which consists in reacting on a urea with formaldehyde in presence of a base, the formaldehyde being present in a smaller proportion than would correspond to 3 molecules of formaldehyde to 1 molecule of the urea, and heating the mixture until gelatinization of the first formed liquid condensation product takes place.

3. The process for manufacturing condensation products which consists in reacting on a urea with formaldehyde in presence of a base, capable of serving as a condensing agent, the formaldehyde being present in a smaller proportion than would correspond to 3 molecules of formaldehyde to 1 molecule of the urea, and heating the mixture until there is effected the formation of a hard insoluble final product.

4. The process for manufacturing condensation products which consists in reacting on a urea with formaldehyde in presence of an ammoniacal body, the formaldehyde being present in a smaller proportion than would correspond to 3 molecules of formaldehyde to 1 molecule of the urea, and heating the mixture until there is effected the formation of a hard insoluble final product.

5. The process for manufacturing condensation products which consists in reacting on a urea with formaldehyde in presence of hexamethylentetramin, the formaldehyde being present in a smaller proportion than would correspond to 3 molecules of formaldehyde to 1 molecule of the urea, and heating the mixture until there is effected the formation of a hard insoluble final product.

6. The process for manufacturing condensation products which consists in reacting on a urea with formaldehyde in presence of a base, the formaldehyde being present in a smaller proportion than would correspond to 3 molecules of formaldehyde to 1 molecule of the urea, heating the mixture until there is effected the formation of a partial reaction product, mixing this product with a filling material and then transforming said mixture into the hard insoluble final product.

7. The process herein described for manufacturing condensation products which consists in reacting on a urea with formaldehyde in presence of a condensing agent possessing basic properties, the formaldehyde being present in a smaller proportion than would correspond to 3 molecules of formaldehyde to 1 molecule of the urea, and maintaining the mixture boiling until the mass does not become turbid on cooling.

8. The process which comprises reacting with a urea on formaldehyde, in the presence of an alkaline condensing agent, subjecting the resulting product to vacuum treatment thereby producing a condensation product containing less than 3 molecules of formaldehyde to 1 molecule of the urea, and further heating such latter product to reduce its fusibility and solubility.

9. A process which comprises reacting with formaldehyde on a urea in the presence of an alkaline condensing agent to produce a condensation product, subjecting the same to a vacuum, subjecting the remaining condensation product containing less than 3 molecules of formaldehyde to 1 molecule of the urea, to further heating to reduce the solubility and fusibility.

10. The new turnery—material obtained by reacting on a urea with formaldehyde in presence of an agent possessing basic properties, the formaldehyde being present in a smaller proportion than would correspond to 3 molecules of formaldehyde to 1 molecule of the urea, and heating the mixture until the first formed liquid condensation product after gelatinization has been converted into a hard body, which product is a fully transparent mass characterized by the specific gravity 1.3 and the index of refraction 1.6.

In testimony whereof I have affixed my signature.

FRITZ POLLAK.

Witnesses:
  O. K. LOOAROY,
  M. HUBCHITZ.